United States Patent
Okada

(10) Patent No.: US 8,412,034 B2
(45) Date of Patent: Apr. 2, 2013

(54) CAMERA BODY, INTERCHANGEABLE LENS, ACCESSORY, CAMERA SYSTEM, AND METHOD FOR REWRITING INFORMATION

(75) Inventor: Koji Okada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 203 days.

(21) Appl. No.: 13/048,373

(22) Filed: Mar. 15, 2011

(65) Prior Publication Data

US 2011/0229115 A1    Sep. 22, 2011

(30) Foreign Application Priority Data

Mar. 17, 2010   (JP) ................................ 2010-061057

(51) Int. Cl.
   *G03B 17/56*   (2006.01)
(52) U.S. Cl. .............................. 396/71; 396/91; 396/530
(58) Field of Classification Search ...................... 396/71
   See application file for complete search history.

(56) References Cited

U.S. PATENT DOCUMENTS

| 5,382,994 A | * | 1/1995 | Naito et al. ................. 396/530 |
| 5,731,920 A | * | 3/1998 | Katsuragawa ................. 359/827 |
| 7,796,350 B2 | * | 9/2010 | Yumiki et al. ................. 359/808 |
| 2005/0025472 A1 | * | 2/2005 | Sugita et al. ................. 396/71 |
| 2009/0268078 A1 | * | 10/2009 | Miyazaki et al. ............. 348/345 |
| 2011/0103789 A1 | * | 5/2011 | Honjo et al. ................. 396/530 |

FOREIGN PATENT DOCUMENTS

| JP | 63-199336 A | 8/1988 |
| JP | 2002-341424 A | 11/2002 |

* cited by examiner

*Primary Examiner* — Clayton E LaBalle
*Assistant Examiner* — Bret Adams
(74) *Attorney, Agent, or Firm* — Canon USA Inc. IP Division

(57) ABSTRACT

A camera system includes a camera body, an interchangeable lens, and an accessory to be mounted between the camera body and the interchangeable lens, wherein the accessory includes a signal processing unit configured to process a signal input into the accessory, a storage unit configured to store information used for performing the signal processing, and a blocking unit configured to prevent direct communication from the camera body to the interchangeable lens when the information stored in the storage unit is rewritten via the camera body.

17 Claims, 8 Drawing Sheets

CAMERA BODY, INTERCHANGEABLE LENS, ACCESSORY, CAMERA SYSTEM, AND METHOD FOR REWRITING INFORMATION

BACKGROUND OF THE INVENTION

1. Field of the Invention

The present invention relates to a camera body, an interchangeable lens, an accessory mounted between the camera body and the interchangeable lens, a camera system, and a method for rewriting information.

2. Description of the Related Art

In a conventional camera system configured to be able to communicate between a camera body and an interchangeable lens, the interchangeable lens has optical specific information stored therein as electronic data. The optical specific information is, for example, data indicating a relationship between an amount of movement of the lens and an amount of movement of focusing, data relating to an amount of correction of focusing, focal distance data, and diaphragm data. By transmitting such specific information to the camera in appropriate timing, operations such as auto focus (AF), auto exposure (AE) are implemented.

A camera may be used by mounting an accessory between the camera body and the interchangeable lens. In such a case, the optical specific information of the interchangeable lens and that of the accessory are different from that of the interchangeable lens alone. Thus, some cameras detect the connection of an accessory by the camera body or the interchangeable lens to correct the optical specific information.

However, if a camera body and an interchangeable lens whose design are old and a newly designed accessory are combined and used, there is an issue that the correction of the optical specific information as described above cannot be made. The words of "old" and "new" design are used in the following sense. More specifically, a case in which an accessory (accessory of new design) that cannot be detected by a conventional camera body or interchangeable lens (a camera body or interchangeable lens of old design) or that has no correction value is newly developed is considered.

To solve the above issue, Japanese Patent Application Laid-Open No. 63-199336 discusses that an accessory includes a central processing unit (CPU) and only necessary communication between a camera and an interchangeable lens is changed in midstream to correct optical specific information by taking the accessory into consideration. Japanese Patent Application Laid-Open No. 2002-341424 discusses that if a system of a camera body and an interchangeable lens is older than an accessory, optical specific information of the interchangeable lens is corrected by the accessory and transmitted to the camera.

It may become necessary to change the optical specific information due to individual manufacturing variation of each of the camera, lens, and accessory. In such a case, due to old or new system restrictions, correction data in the accessory needs to be rewritten. Moreover, to maintain flexibility of the system, it is desirable to be able to update data or firmware inside the accessory even after the accessory is delivered to a user. Further, to perform the above process without a special input terminal or an additional component, it is necessary to operate the accessory via an existing camera mount.

An accessory normally operates only after a camera body and an interchangeable lens are combined and when a user updates firmware, the update may be performed while the lens is mounted.

When communication is performed from a camera to an accessory in a configuration as discussed by Japanese Patent Application Laid-Open No. 63-199336 or Japanese Patent Application Laid-Open No. 2002-341424, information necessary to be corrected is processed inside the accessory and other information is transmitted directly from the camera to the lens. Thus, if, for example, a dedicated command to rewrite information inside the accessory is newly created and transmitted from the camera side, the lens side also receives the command.

However, if the lens side does not understand the command, the whole camera system may be adversely affected by causing a malfunction, for example, movement of a focus lens or a diaphragm or data inside the lens being rewritten.

SUMMARY OF THE INVENTION

According to an aspect of the present invention, a camera system includes a camera body, an interchangeable lens, and an accessory to be mounted between the camera body and the interchangeable lens, wherein the accessory includes a signal processing unit configured to process a signal input into the accessory, a storage unit configured to store information used for performing the signal processing, and a blocking unit configured to prevent direct communication from the camera body to the interchangeable lens when the information stored in the storage unit is rewritten via the camera body.

According to another aspect of the present invention, a camera system includes a camera body, an interchangeable lens, and an accessory to be mounted between the camera body and the interchangeable lens, wherein the accessory includes a signal processing unit configured to process a signal input into the accessory, and a storage unit configured to store information used for performing the signal processing, wherein the interchangeable lens includes a control unit configured to perform control to prevent the interchangeable lens from responding to a command transmitted from the camera body when the information stored in the storage unit is rewritten via the camera body.

According to yet another aspect of the present invention, a camera body capable of mounting an accessory which includes a signal processing unit configured to process an input signal and a storage unit configured to store information used for performing the signal processing includes an output unit, wherein, when the information stored in the storage unit is rewritten via the camera body in a state in which the accessory is mounted on the camera body and an interchangeable lens is mounted on the accessory, the output unit outputs a command to prevent direct communication from the camera body to the interchangeable lens.

According to yet another aspect of the present invention, an accessory capable of being mounted between a camera body and an interchangeable lens includes a signal processing unit configured to process an input signal, a storage unit configured to store information used for performing the signal processing, and a blocking unit configured to prevent direct communication from the camera body to the interchangeable lens when the information stored in the storage unit is rewritten via the camera body in a state in which the accessory is mounted on the camera body and the interchangeable lens.

According to yet another aspect of the present invention, an interchangeable lens capable of mounting an accessory which includes a signal processing unit configured to process an input signal and a storage unit configured to store information used for performing the signal processing includes a control unit, wherein the control unit performs control to prevent a response to a command transmitted from the camera body when the information stored in the storage unit included in the accessory is rewritten via the camera body in a state in which the interchangeable lens is mounted to the camera body via the accessory.

According to yet another aspect of the present invention, a method for rewriting information stored in an accessory in a camera system including a camera body, an interchangeable lens, and the accessory mounted between the interchangeable lens and the camera body includes blocking communication from the camera body to the interchangeable lens by the accessory, transmitting a command to rewrite the information stored in the accessory from the camera body to the accessory, and rewriting the information stored in a storage unit after the command is received.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Operations of a camera system according to a first exemplary embodiment of the present invention will be described with reference to FIGS. 1 to 5.

Figure 1:
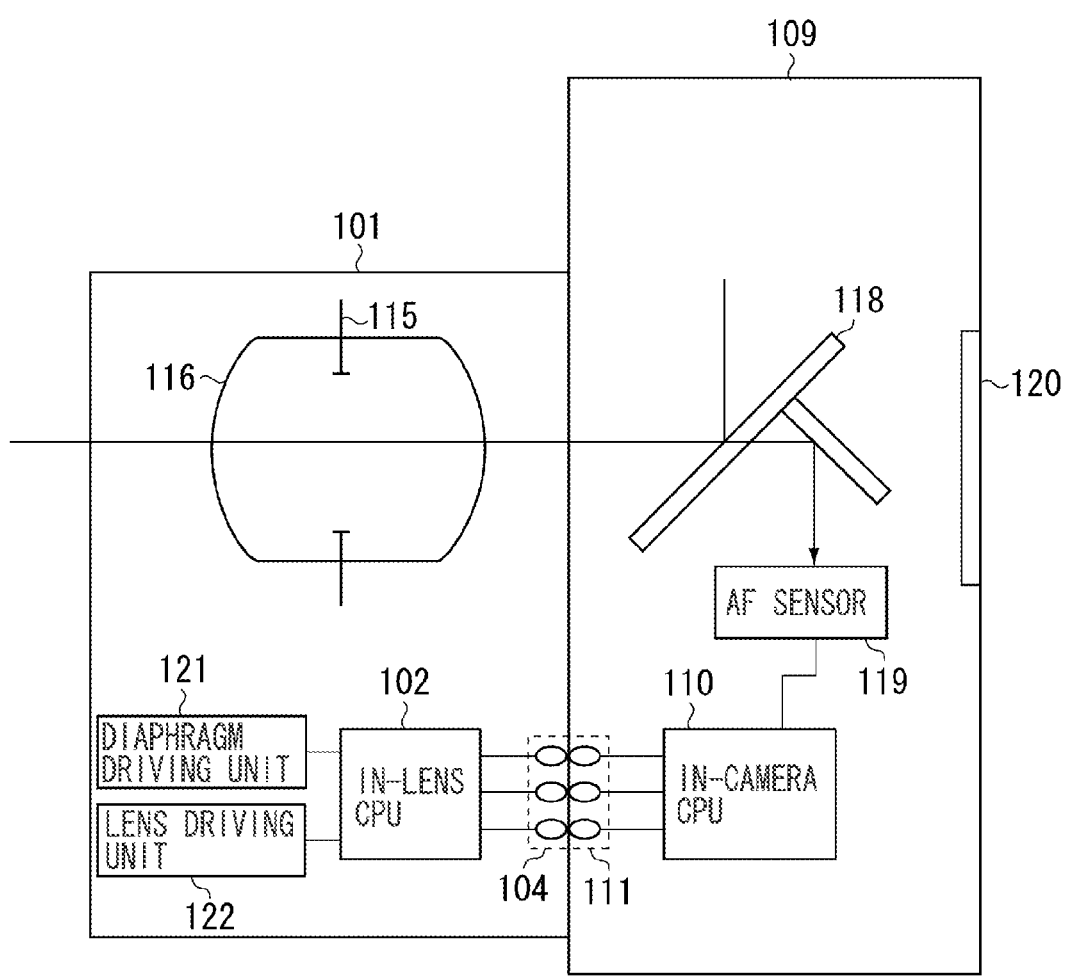
FIG. 1 is a block diagram illustrating a basic configuration of a camera-interchangeable lens connection.

First, FIG. 1 is a block diagram illustrating a basic configuration according to the first exemplary embodiment of the present invention. In the present camera system, an interchangeable lens 101 and a camera body 109 can, as illustrated in FIG. 1, mutually communicate via communication terminals 104 and 111. By exchanging states of the camera and each lens, optical specific information, and drive commands using the communication, the interchangeable lens 101 and the camera body 109 normally operate as the camera system. The camera system includes the interchangeable lens 101, the camera body 109, and an accessory 105 mounted between the interchangeable lens 101 and the camera body 109.

The interchangeable lens 101 includes a in-lens CPU 102 to perform control inside the interchangeable lens, an optical system 116 containing an AF lens, zooming lens, and correcting lens, and drive units to drive these units. The interchangeable lens 101 also includes a zoom position detection brush to detect a position of the zooming lens and a focus position detection brush to detect a position of the AF lens. Further, the interchangeable lens 101 includes a position detection unit to detect a position of the correcting lens and a camera-shake detection unit to detect vibration of the interchangeable lens.

The camera body 109 includes, for example, an in-camera CPU 110 to perform control inside the camera system and a photometric unit, a ranging unit, a shutter mechanism to limit an exposure time of an image sensor (such as a charge-coupled device (CCD) or complementary metal-oxide semi-conductor (CMOS) sensor), and a display unit to display various pieces of information of the camera.

As the accessory 105, for example, a wide converter including an optical system 117, a tele-side converter, a close-up lens, or an extender can be used.

A storage unit (not illustrated) (for example, an electrically rewritable Flash-read-only memory (ROM)) inside the in-lens CPU 102 has optical specific information of the interchangeable lens stored therein and the optical specific information is transmitted to the in-camera CPU 110 via the communication terminals 104 and 111. The optical specific information is, for example, data indicating a relationship between an amount of movement of the lens and an amount of movement of focusing, data relating to an amount of correction of focusing, focal distance data, and diaphragm data.

A luminous flux that has passed through the optical system 116 of the interchangeable lens is divided by a main mirror 118 into a luminous flux guided to a finder (not illustrated) and a luminous flux guided to an AF sensor 119. The in-camera CPU 110 processes an output of the AF sensor 119 to detect the focus and calculates, together with the optical specific information, a driving amount of the AF lens contained in the optical system 116 of the interchangeable lens.

The in-camera CPU 110 transmits the calculated lens driving amount to the in-lens CPU 102 via the communication terminals 111 and 104. The in-lens CPU 102 controls a lens driving unit 122 according to the received lens driving amount to drive the AF lens contained in the optical system 116 of the interchangeable lens.

If a photographing command is transmitted to the in-camera CPU 110 after a release switch (not illustrated) being pressed, the in-camera CPU 110 calculates a diaphragm driving amount according to an diaphragm value of a photometric sensor (not illustrated) or set by a user. Then, the in-camera CPU 110 transmits the calculated driving amount to the in-lens CPU 102 via the communication terminals 111 and 104.

The in-lens CPU 102 controls a diaphragm driving unit 121 according to the received diaphragm driving amount to drive a diaphragm 115. Further, the in-camera CPU 110 drives a shutter (not illustrated) set up in front of the main mirror 118 and an image sensor 120 so that the luminous flux is guided to the image sensor 120 to capture an image.

Figure 2:
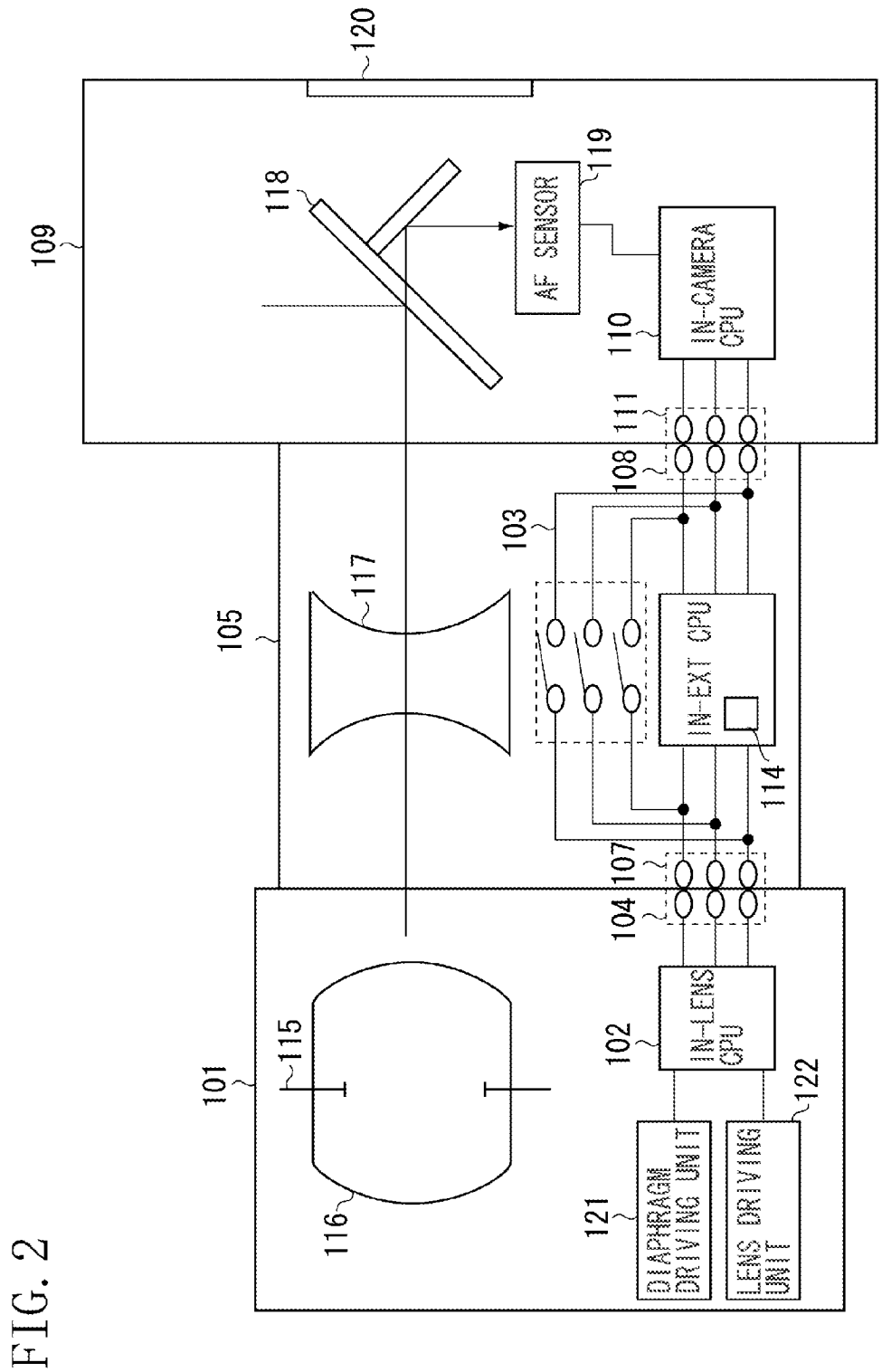
FIG. 2 is a block diagram illustrating a basic configuration of a camera-accessory-interchangeable lens connection.

FIG. 2 illustrates a case in which the accessory 105 is mounted between the interchangeable lens 101 and the camera body 109. The interchangeable lens 101 and the accessory 105, and the accessory 105 and the camera body 109 are connected by, for example, a mount (not illustrated). At this point, the accessory 105 is connected to the communication terminal 104 on the lens side via a communication terminal 107 and to the communication terminal 111 on the camera side via a communication terminal 108, so that the interchangeable lens 101, the camera body 109, and the accessory 105 are mutually communicable.

Moreover, the interchangeable lens 101 and the camera body 109 are mutually communicable via the accessory 105. An in-accessory CPU (In-EXT CPU) 106 is a signal processing unit to process a signal input into the accessory. The In-EXT CPU 106 includes a communication device (not illustrated) and can monitor communication between the camera and the lens. The communication between the camera and the lens is directly performed from the camera to the lens if a communication blocking switch 103 is connected, but if the communication blocking switch 103 is in a blocked state, communication is not directly transmitted. The accessory in the present exemplary embodiment is assumed to be an extender.

The in-accessory CPU (in-EXT CPU) 106 in FIG. 2 includes a storage unit 114 and has information for correcting the optical specific information transmitted from the interchangeable lens and information such as firmware used to perform signal processing in the in-EXT CPU 106 stored therein.

Here, an electrically rewritable Flash-ROM or the like can be used as the storage unit 114. Further, the storage unit 114 does not have to be provided inside the in-EXT CPU 106 and may be configured in such a way that the in-EXT CPU 106 can extract information from the storage unit 114.

The in-EXT CPU 106 monitors the communication between the interchangeable lens and camera body via the communication terminals 107 and 108. Further, the in-EXT CPU 106 can operate the communication blocking switch 103 and can operate communication contents between the camera and the lens by blocking the communication between the camera and the lens (direct communication).

Figure 3:
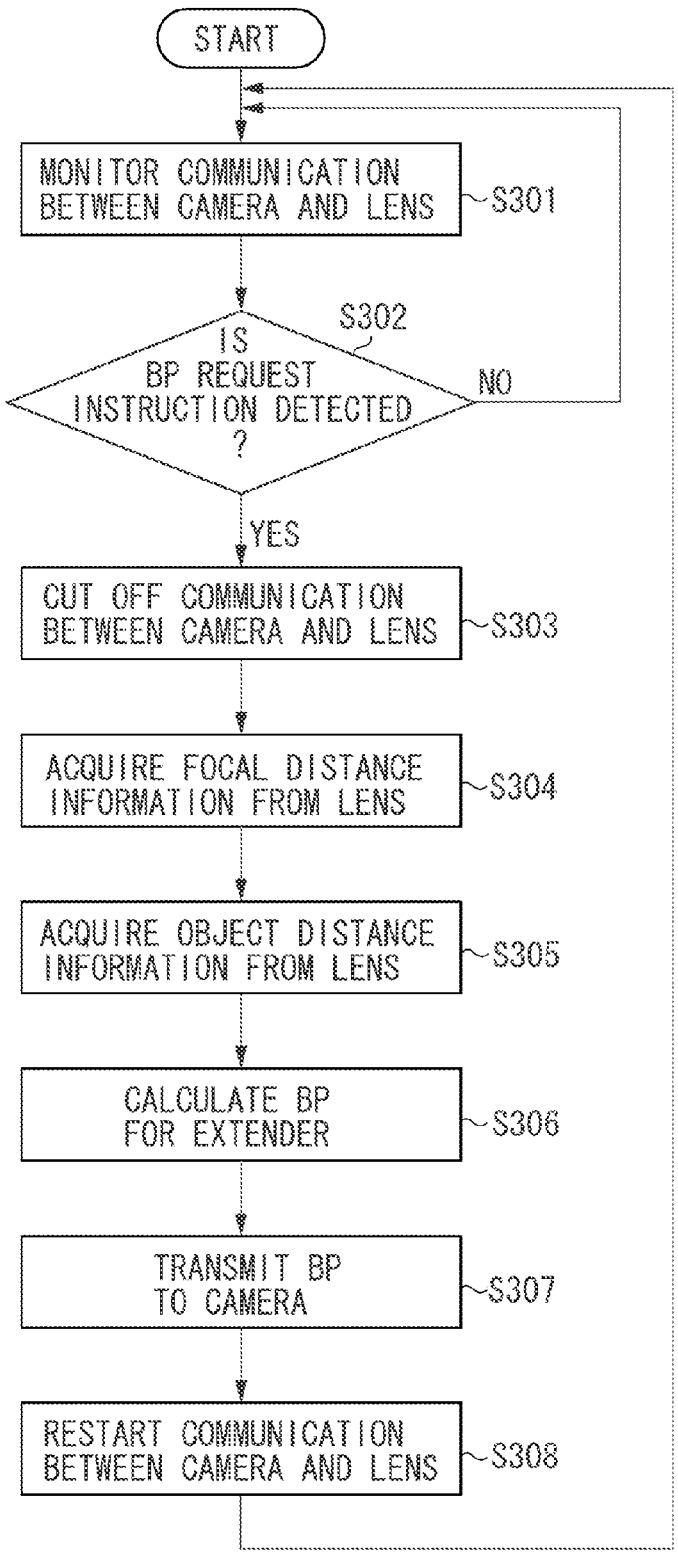
FIG. 3 is a flow chart according to a first exemplary embodiment.

With reference to a flow chart illustrated in FIG. 3, how the extender changes data regarding an amount of correction of focusing (hereinafter referred to as a BP) is described. First, in step S301, the in-EXT CPU 106 monitors the communication between the camera and the lens from the communication terminals 107 and 108.

In step S302, if the in-EXT CPU 106 detects that the camera has transmitted a BP request command to the lens during monitoring (Yes in step S302), then in step S303, the in-EXT CPU 106 operates the communication blocking switch 103 to cut off the communication between the camera and the lens. Then, in step S304, the in-EXT CPU 106 transmits a focal distance information request command to the in-lens CPU 102 to acquire focal distance information which is one piece of information necessary to change the BP.

In step S305, the in-EXT CPU 106 transmits an object distance information request command to the in-lens CPU 102 to acquire object distance information which is one piece of information necessary to change the BP. In step S306, the in-EXT CPU 106 calculates a new BP corresponding to the extender from the acquired focal distance information and the object distance information. In the present exemplary embodiment, the new BP is calculated, but may be selected from table data prepared in advance. Then, in step S307, the in-EXT CPU 106 transmits the new calculated BP to the in-camera CPU 110.

When the transmission is completed, in step S308, the in-EXT CPU 106 operates the communication blocking switch 103 again to restart the communication between the camera and the lens. Then, the in-EXT CPU 106 returns the processing to S301 to continue monitoring of the communication between the camera and the lens until the camera transmits a BP request command again.

Figure 4:
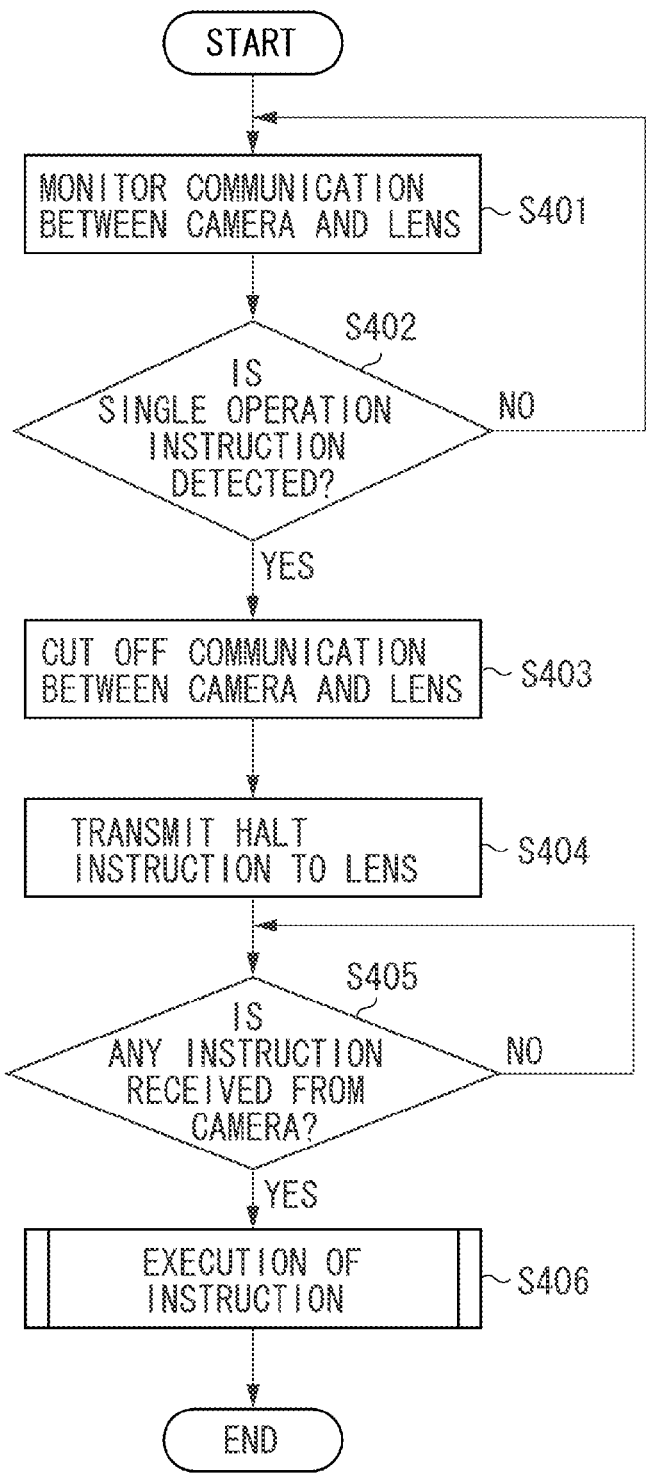
FIG. 4 is a flow chart according to the first exemplary embodiment.

A method for rewriting information when data or firmware inside the extender is rewritten from the side of the camera in the system including the camera, the lens, and the extender described above will be described using a flow chart illustrated in FIG. 4.

First, in step S401, the in-EXT CPU 106 monitors the communication between the camera and the lens from the communication terminals 107 and 108. In step S402, if the in-EXT CPU 106 detects that the camera has transmitted a single operation command (predetermined command) to the lens during monitoring (Yes in step S402), then in step S403, the in-EXT CPU 106 operates the communication blocking switch 103 to cut off the communication between the camera and the lens.

The single operation command is a command acting as a trigger for the extender, which normally corrects optical the specific information of the interchangeable lens, to perform communication on its own accord with the camera regardless of the state of the interchangeable lens. Thus, the command is formally transmitted from the camera to the lens, but there is no need for the lens to have a clearly defined operation and the extender that detects the command behaves as described below. In step S404, the in-EXT CPU 106 transmits a halt command to make a transition to a power saving state to the in-lens CPU 102.

The power saving state refers to a state in which power supply to a circuit system inside the interchangeable lens 101 is limited, an operating frequency of the in-lens CPU 102 is reduced, or an arithmetic operation is stopped. Then in step S405, if a command to rewrite data or firmware inside the extender is transmitted from the camera side (Yes in step S405), in step S406, the in-EXT CPU 106 executes the transmitted command to rewrite the information in the storage unit 114.

In step S403, both of the communication from the camera to the lens and the communication from the lens to the camera may be cut off or only the communication from the camera to the lens may be cut off. In any case, it is only necessary to prevent a signal from the side of the camera body from being transmitted to the side of the interchangeable lens when the information in the storage unit 114 is rewritten.

Figure 5:
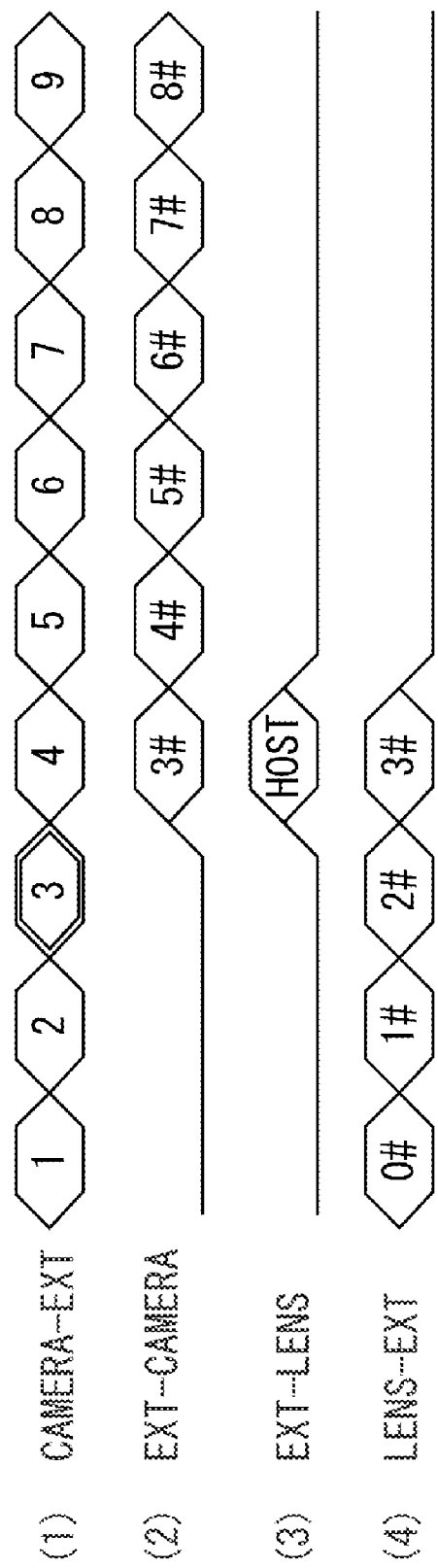
FIG. 5 is a timing chart according to the first exemplary embodiment.

Next, flows of communication between respective CPUs will be described using a timing chart in FIG. 5. In FIG. 5, a flow (1) represents communication from the in-camera CPU 110 to the extender side and a flow (2) represents communication from the in-EXT CPU 106 to the in-camera CPU 110 which corresponds to communication flowing through the communication terminals 108 and 111 in FIG. 2. A flow (3) represents communication from the in-EXT CPU 106 to the in-lens CPU 102 and a flow (4) represents communication from the in-lens CPU 102 to the extender side which corresponds to communication flowing through the communication terminals 104 and 107 in FIG. 2.

The expression of the extender side does not necessarily indicate the in-EXT CPU 106. In a state in which the communication blocking switch 103 is connected, that is, a state that the camera and the lens can directly communicate, the communication from the in-camera CPU 110 to the extender side reaches the in-lens CPU 102 directly. Conversely, the communication from the in-lens CPU 102 to the extender side reaches the in-camera CPU 110 directly.

In the present exemplary embodiment, a system in which the in-lens CPU 102 or the in-EXT CPU 106 returns a response to communication contents from the camera side is assumed. In FIG. 5, responses 1#, 2#, 3#, and so on are returned to communication 1, 2, 3, and so on from the camera side. In an initial state, the communication blocking switch 103 is connected.

In the flow (1) in FIG. 5, when a single operation command is transmitted to the extender side in a timing 3, the command reaches the in-lens CPU 102 and at the same time, the command is detected by the in-EXT CPU 106. Then, the in-EXT CPU 106 turns off the communication blocking switch 103 to cut off direct communication between the camera and lens and transmits a halt command to the in-lens CPU 102. Steps heretofore correspond to steps S401 to S404 in the above described flow chart in FIG. 4. Then, the command transmitted from the in-camera CPU 110 is totally dealt with by the in-EXT CPU 106 which returns a response to the in-camera CPU 110.

In the present exemplary embodiment, it is assumed that a camera body is mounted on the camera side, but the present exemplary embodiment is not limited to this configuration and an alignment device including a communication function similar to the camera body or the like may be mounted.

According to the present exemplary embodiment, if the interchangeable lens has an old design and cannot recognize the presence of an extender or a single operation command, the extender stops the lens operation by cutting off communication between the camera and the lens and therefore, malfunctions of the lens can be prevented.

Operations of a camera system according to a second exemplary embodiment of the present invention will be described with reference to FIGS. 8 and 6.

The basic configuration of the camera system is similar to that of the first exemplary embodiment and thus, a description thereof will not be repeated and only a different portion from the first exemplary embodiment will be described. First, FIG. 8 has a power source to supply power to CPUs and the like and a power supply path thereof added to FIG. 2 (naturally, a power source is also needed in the configuration in FIG. 2, but is not described because the power source is not needed for description).

A power supply blocking switch 112 is newly provided inside the extender. The power supply blocking switch 112 can be opened or closed by the in-EXT CPU 106 if necessary. When the power supply blocking switch 112 is opened, that is, the power supply path is blocked, the power is supplied to the in-EXT CPU 106, but the power supply to the in-lens CPU 102 is cut off.

Figure 6:
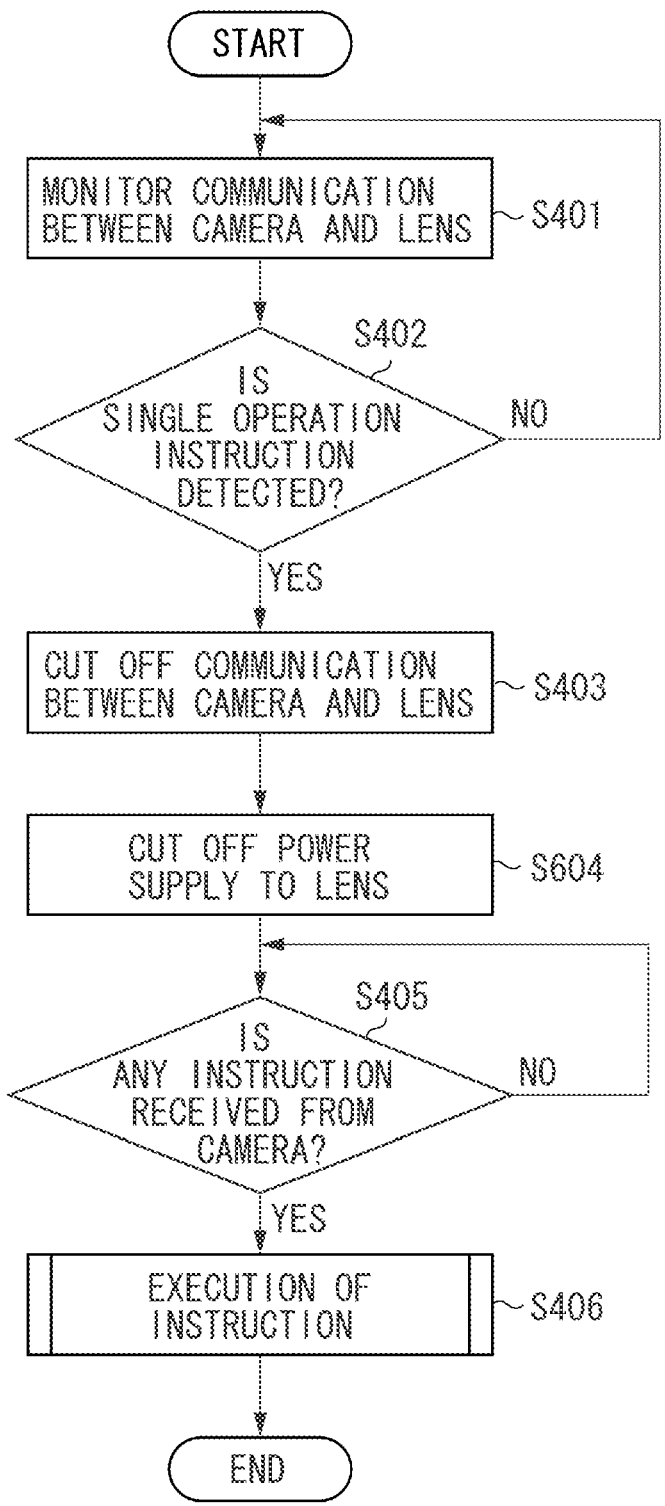
FIG. 6 is a flow chart according to a second exemplary embodiment.

FIG. 6 is a flow chart according to the present exemplary embodiment. The only difference from the flow chart in FIG. 4 is that step S404 in FIG. 4 is replaced by step S604 in FIG. 6 and other portions are the same. Thus, a description thereof will not be repeated.

The in-EXT CPU 106 detects a single operation command (predetermined command) and cuts off the communication between the camera and the lens by operating the communication blocking switch 103. Then, in step S604, the in-EXT CPU 106 operates the power supply blocking switch 112 to cut off the power supply to the interchangeable lens. In this case, the lens will not operate and thus, a communication path for the communication between the camera and the lens needs not necessarily be blocked and step S403 does not have to be executed.

According to the present exemplary embodiment, if the interchangeable lens has an old design and cannot recognize the presence of an extender or a single operation command, the extender stops the lens operation by cutting off the power supply to the lens and therefore, malfunctions of the lens can be prevented.

Figure 7:
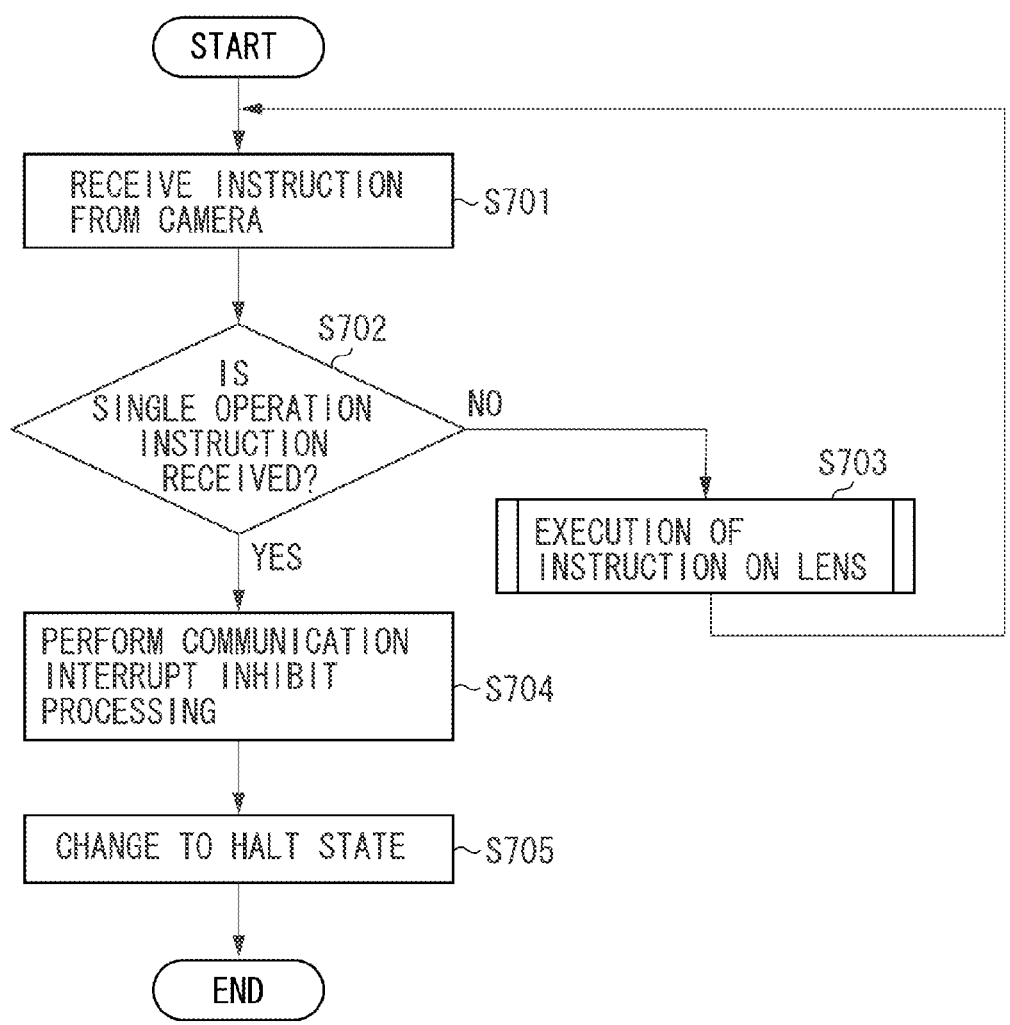
FIG. 7 is a flow chart according to a third exemplary embodiment.

Operations of a camera system according to a third exemplary embodiment of the present invention will be described with reference to FIGS. 2 and 7.

The basic configuration of the camera system is similar to that of the first exemplary embodiment and thus, a description thereof will not be repeated and only a different portion from the first exemplary embodiment will be described. In the first exemplary embodiment, when a single operation command of the extender is transmitted from the in-camera CPU 110, only the extender deals with the command. In the present exemplary embodiment, a behavior of the interchangeable lens when the interchangeable lens can recognize the presence of the extender and each single operation command will be described using the flow chart in FIG. 7.

First, in step S701, the in-lens CPU 102 receives a command from the in-camera CPU 110.

In step S702, the in-lens CPU 102 determines whether a single operation command (predetermined command) is transmitted. If the command is not the single operation command (No in step S702), then in step S703, the in-lens CPU 102 performs processing based on the command.

If the single operation command is transmitted (Yes in step S702), then in step S704, the in-lens CPU 102 puts itself in a communication interrupt inhibit state and, in step S705, puts itself in a power saving state.

Alternatively, instead of disabling communication as described above, the in-lens CPU 102 may simply ignore (not respond to) a command transmitted from the in-camera CPU 110. More specifically, the in-lens CPU 102 (control unit) may perform control not to return a response to the command transmitted from the in-camera CPU 110. Further, instead of shifting to the power saving state, the in-lens CPU 102 may simply shift to a communication standby state.

According to the present exemplary embodiment, the interchangeable lens itself recognizes a single operation command and ignores subsequent communication and therefore, if the design of a lens is newer than that of an extender and the extender cannot normally recognize the lens, malfunctions of the lens can be prevented.

By combining the first exemplary embodiment and the present exemplary embodiment, reliability can further be improved.

Figure 8:
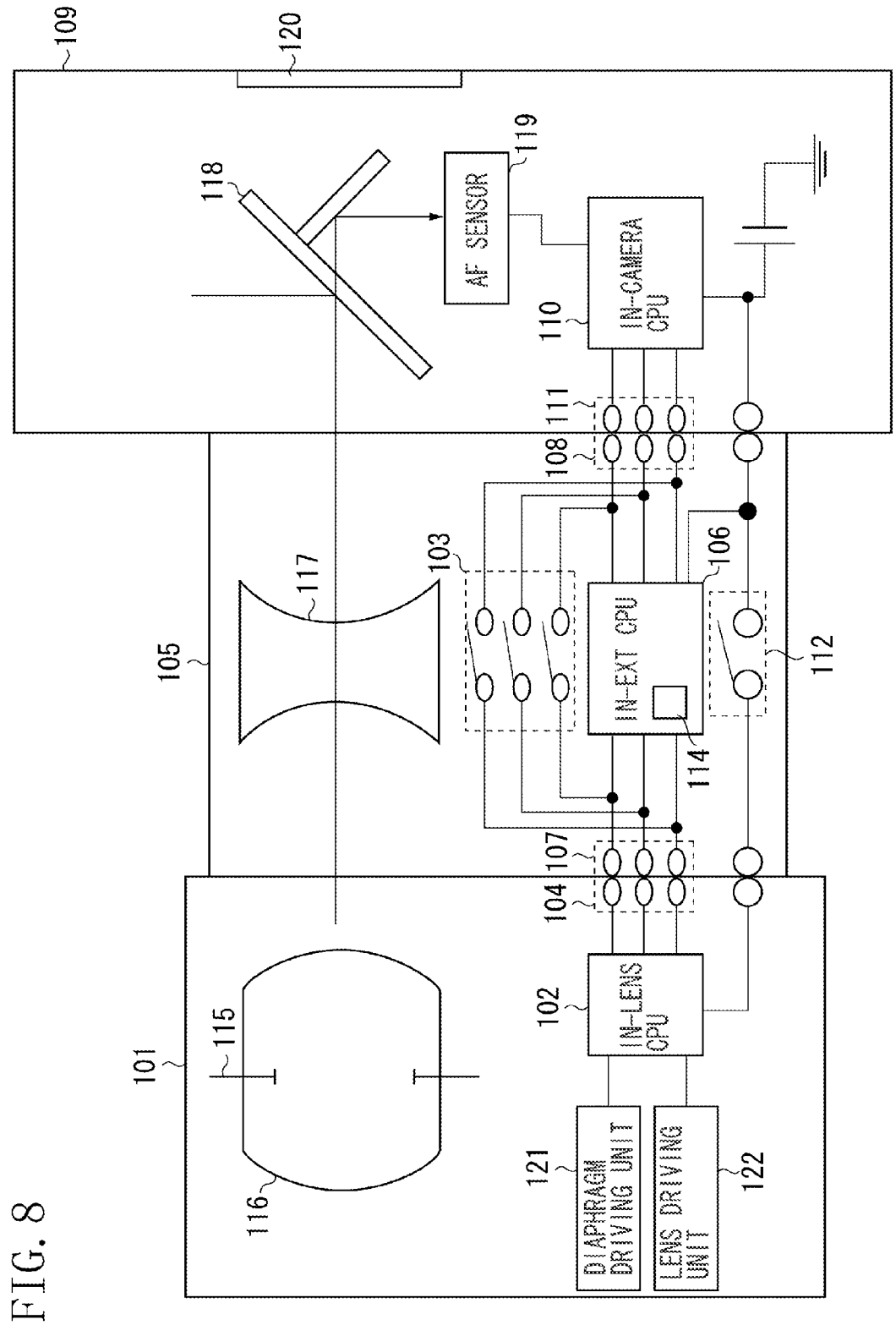
FIG. 8 is a block diagram illustrating a basic configuration of a camera-accessory-interchangeable lens connection.

Further, by combining the second exemplary embodiment and the present exemplary embodiment in the configuration including the power supply blocking switch as illustrated in FIG. 8, reliability can further be improved.

In the foregoing, exemplary embodiments of the present invention have been described and the present invention can be applied to both still cameras and video cameras.

In the present invention, when data in an accessory is rewritten, data is transmitted to the accessory via the camera body and thus, it is necessary to once supply data to be rewritten to the camera body. At that time, data may be supplied to the camera body by inserting a memory or the like in which rewrite data is stored into a slot provided in the camera body, from which the camera body reads the data and transmits the data to the accessory.

Alternatively, after the camera body being connected to a personal computer (PC) via a cable or the like, data transmitted from the PC may be transmitted by the camera body to the accessory. Further, instead of the camera body, an accessory may be mounted on a dedicated device to rewrite data in the accessory, from which data is transmitted to the accessory.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-061057 filed Mar. 17, 2010, which is hereby incorporated by reference herein in its entirety.

What is claimed is:

1. A camera system comprising:
   a camera body;
   an interchangeable lens; and
   an accessory to be mounted between the camera body and the interchangeable lens,
   wherein the accessory includes a signal processing unit configured to process a signal input into the accessory, a storage unit configured to store information used for performing the signal processing, and a blocking unit configured to prevent direct communication from the camera body to the interchangeable lens when the information stored in the storage unit is rewritten via the camera body.

2. The camera system according to claim 1, wherein when the accessory detects a predetermined command output from the camera body, the accessory prevents the direct communication from the camera body to the interchangeable lens by the blocking unit.

3. The camera system according to claim 1, wherein the blocking unit blocks the direct communication from the camera body to the interchangeable lens.

4. The camera system according to claim 1, wherein the blocking unit blocks power supply from the camera body to the interchangeable lens.

5. The camera system according to claim 1, wherein the accessory transmits a command to make a transition to a power saving state to the interchangeable lens when the information stored in the storage unit is rewritten.

6. The camera system according to claim 1, wherein the information is information for correcting specific information received from the interchangeable lens or information about firmware.

7. A camera system comprising:
   a camera body;
   an interchangeable lens; and
   an accessory to be mounted between the camera body and the interchangeable lens, wherein the accessory includes a signal processing unit configured to process a signal input into the accessory, and a storage unit configured to store information used for performing the signal processing,
   wherein the interchangeable lens includes a control unit configured to perform control to prevent the interchangeable lens from responding to a command transmitted from the camera body when the information stored in the storage unit is rewritten via the camera body.

8. A camera body capable of mounting an accessory which includes a signal processing unit configured to process an input signal and a storage unit configured to store information used for performing the signal processing, the camera body comprising:
   an output unit, wherein, when the information stored in the storage unit is rewritten via the camera body in a state in which the accessory is mounted on the camera body and an interchangeable lens is mounted on the accessory, the output unit outputs a command to prevent direct communication from the camera body to the interchangeable lens.

9. The camera body according to claim 8, wherein the command to prevent the direct communication from the camera body to the interchangeable lens is a command to cause the accessory to block the direct communication from the camera body to the interchangeable lens.

10. The camera body according to claim 8, wherein the command to prevent the direct communication from the camera body to the interchangeable lens is a command to cause the accessory to block power supply from the camera body to the interchangeable lens.

11. An accessory capable of being mounted between a camera body and an interchangeable lens, the accessory comprising:
    a signal processing unit configured to process an input signal;
    a storage unit configured to store information used for performing the signal processing; and
    a blocking unit configured to prevent direct communication from the camera body to the interchangeable lens when the information stored in the storage unit is rewritten via the camera body in a state in which the accessory is mounted on the camera body and the interchangeable lens.

12. The accessory according to claim 11, wherein, if a predetermined command output from the camera body is detected, the direct communication from the camera body to the interchangeable lens is prevented by the blocking unit.

13. The accessory according to claim 11, wherein the blocking unit prevents the direct communication from the camera body to the interchangeable lens.

14. The accessory according to claim 11, wherein the blocking unit blocks power supply from the camera body to the interchangeable lens.

15. An interchangeable lens capable of mounting an accessory which includes a signal processing unit configured to process an input signal and a storage unit configured to store information used for performing the signal processing, the interchangeable lens comprising:
    a control unit, wherein the control unit performs control to prevent a response to a command transmitted from the camera body when the information stored in the storage unit included in the accessory is rewritten via the camera body in a state in which the interchangeable lens is mounted to the camera body via the accessory.

16. The interchangeable lens according to claim 15, wherein the control to prevent the response to the command transmitted from the camera body is performed after a predetermined command transmitted from the camera body is received.

17. A method for rewriting information stored in an accessory in a camera system including a camera body, an interchangeable lens, and the accessory mounted between the interchangeable lens and the camera body, the method comprising:
    blocking communication from the camera body to the interchangeable lens by the accessory;
    transmitting a command to rewrite the information stored in the accessory from the camera body to the accessory; and
    rewriting the information stored in the accessory after the command is received.

* * * * *